(12) United States Patent
Oohara

(10) Patent No.: US 6,189,040 B1
(45) Date of Patent: Feb. 13, 2001

(54) DATA RELAYING UNIT AND METHOD OF TRANSMITTING DATA BETWEEN HOST AND CLIENT DEVICES

(75) Inventor: Kazuhiro Oohara, Hamamatsu (JP)

(73) Assignee: Yahama Corporation, Hamamatsu (JP)

( * ) Notice: Under 35 U.S.C. 154(b), the term of this patent shall be extended for 0 days.

(21) Appl. No.: 08/906,565

(22) Filed: Aug. 5, 1997

(30) Foreign Application Priority Data

Aug. 6, 1996 (JP) .................................................. 8-207204

(51) Int. Cl.[7] .................................................. G06F 13/00
(52) U.S. Cl. .............................. 709/238; 710/38; 710/14; 710/131
(58) Field of Search ..................... 395/200.68, 200.55, 395/290, 200.8, 200.73, 200.74; 370/351, 902, 408, 254; 710/38, 4, 131, 132, 14, 20, 21, 22, 29, 1, 5, 6; 709/238, 232

(56) References Cited

U.S. PATENT DOCUMENTS

| | | | |
|---|---|---|---|
| 3,810,105 | * | 5/1974 | England ............................ 370/172.5 |
| 4,124,889 | * | 11/1978 | Kaufman et al. ........................ 710/2 |
| 4,912,552 | * | 3/1990 | Allison, III et al. ................... 358/84 |
| 5,488,695 | * | 1/1996 | Cutter .................................... 395/290 |
| 5,764,895 | * | 6/1998 | Chung ................................. 395/700.8 |
| 5,784,581 | * | 7/1998 | Hannah ................................. 395/290 |
| 5,787,256 | * | 7/1998 | Marik et al. ..................... 395/200.68 |
| 5,832,492 | * | 11/1998 | Wooten .................................. 707/10 |
| 5,886,732 | * | 3/1999 | Humpleman ............................ 348/10 |

* cited by examiner

*Primary Examiner*—Zarni Maung
*Assistant Examiner*—Abdullahi E. Salad
(74) *Attorney, Agent, or Firm*—Morrison & Foerster (57) ABSTRACT

A data relaying unit includes a first input/output terminal for connection to a host device, a plurality of second input/output terminals for connection with a plurality of client devices, a quasi host device that, in accordance with an instruction from the host computer, controls direct data transmission between the client devices, and a connection switching device that selectively connects the individually second input/output terminals to either the first input/output terminal or the quasi host device. In accordance with an instruction from the host computer, the connection switching device connects the second input/output terminals of predetermined ones of the client devices to the quasi host device so as to permit direct data transmission between the predetermined client devices. Schedule for the data transmission between the client devices is managed by the quasi host device. The quasi host may monitor a condition of the data transmission between the client devices and inform the host device of presence/absence of a unusual condition or the like.

13 Claims, 7 Drawing Sheets

(PRIOR ART)

(PRIOR ART)

FIG. 11

(PRIOR ART)

FIG. 12

DATA RELAYING UNIT AND METHOD OF TRANSMITTING DATA BETWEEN HOST AND CLIENT DEVICES

BACKGROUND OF THE INVENTION

The present invention relates to data relaying units which are suitable for use with serial buses and also relates to methods of transmitting data between host and client devices.

In the following description, the term "bus" refers to a data transmission path to which a plurality of devices are connected and whose input/output schedule is managed by a host computer.

With development in information-oriented society today, personal computers have been rapidly coming into wide use in various fields, and in some business organizations, almost every employee has a personal computer on his or her desk. Also, for the purpose of conducting particular operations using a plurality of personal computers, a LAN (Local Area Network) system may be built to share same information and pieces of peripheral equipment such as a printer and a facsimile.

Figure 11:
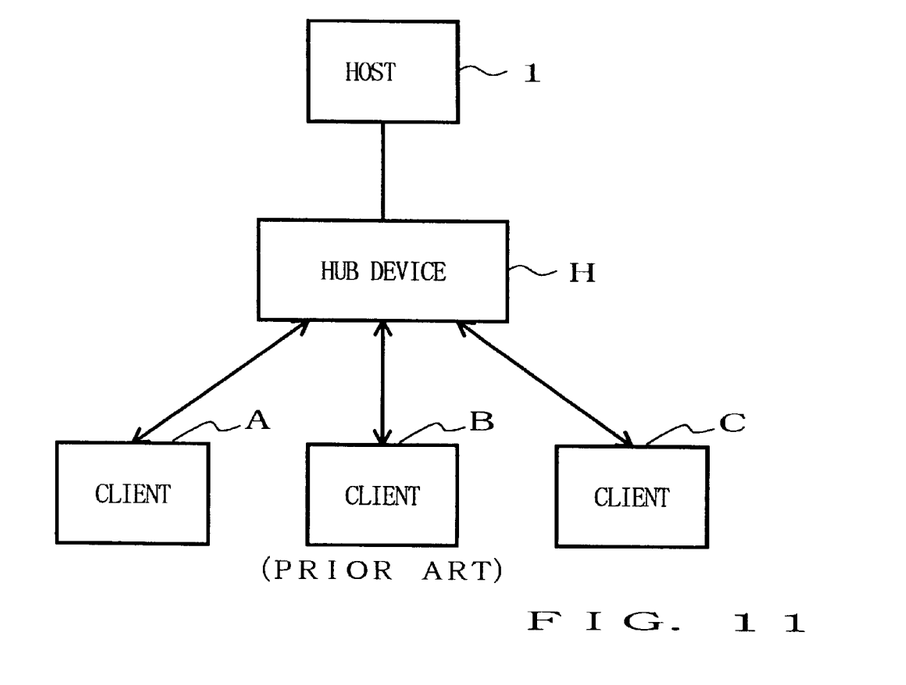
FIG. 11 is a block diagram illustrating an example of a conventional LAN system comprising start-connected token buses.

FIG. 11 shows a typical example of a LAN system arranged with star-connecetd token buses, where reference numeral 1 represents a host device or host computer in the form of a personal computer and reference character H represents a hub device connected to the host device to function as a concentrator device for the data buses. Further, reference characters A, B and C represent client devices connected with the hub device H, each of which comprises a personal computer or peripheral equipment. Among these devices, data divided into a plurality of predetermined time units called "time slots" are transmitted via serial buses composed of twisted pair lines. Via the hub device H, the host device 1 controls data transmission between the client devices A–C and between the host device 1 and each of the client devices A–C. That is, the host device 1 control distribution of data flowing through the data buses, and such control is generally known as "bus scheduling".

Figure 12:
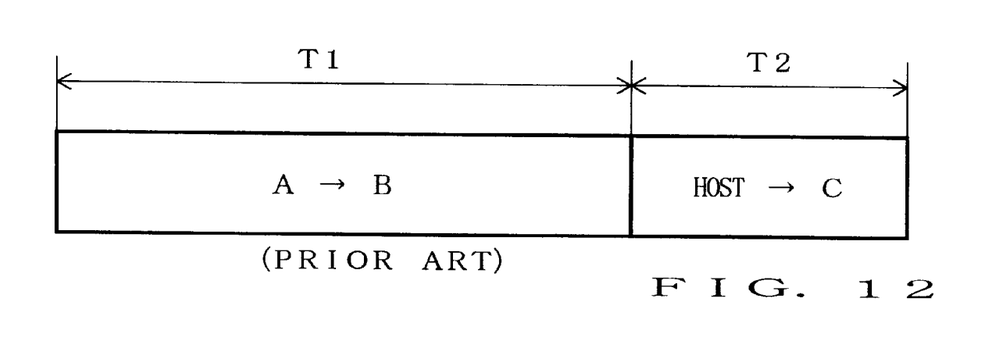
FIG. 12 is a diagram illustrating bus scheduling performed by a host in the conventional LAN system.

However, the rates of the data transmissions between the devices are subject to a certain limit depending on the respective performance of interfaces used. Thus, if a large quantity of data are to be transmitted between specific client devices in a time slot, there would arise a problem that the data transmission between other client devices than the above-mentioned specific client devices is limited to a considerable degree. Assuming that a large quantity of data are to be transmitted from the client device A to the client device B in a specific time slot, the host device 1 performs the bus scheduling as shown in FIG. 12. Most part of this specific time slot is occupied by the data transmission period T1 from the client device A to the client device B and the data transmission between the host device 1 and the other client device C is significantly limited because it can be conducted only at the remaining time T2 of the time slot.

SUMMARY OF THE INVENTION

It is therefore an object of the present invention to provide a data relaying unit which permits an efficient data transmission.

In order to accomplish the above-mentioned object, a data relaying unit in accordance with the present invention includes a quasi host device to control direct data transmission between a plurality of client devices. The data relaying unit also includes a connection switching device which performs connection switching such that when data are to be transmitted between the client devices, it connects data input/output terminals, corresponding to the client devices, to the quasi host device, but when data are to be transmitted between the host device and one of the client devices, it connects the input/output terminals to input/output terminals of the host device.

In a preferred implementation, the data relaying unit in accordance with the present invention is provided for connection between a host device and a plurality of client devices and comprises: a plurality of connectors corresponding to the client devices; a control device which, when the host device instructs that data transmission should be performed between specific ones of the client devices, manages a schedule for the data transmission between the specific client devices; and a connection switching device which connects the connectors corresponding to the specific client devices to the control device and connects the other connector corresponding to the other client device to the host device. Thus, data are transmitted between the specific client devices in accordance with the schedule managed by the control device, without intervention of the host device.

Here, the above-mentioned control device corresponds to the quasi host device. When data are to be transmitted between the client devices, the host device only instructs the data relaying unit from which of the client devices data should be transmitted and by which of the other client devices these data should be received. Actual processing necessary for the data transmission is carried out in accordance with the control device of the data relaying unit, i.e., the quasi host device, in a direct manner without intervention of the host device. This arrangement can effectively shorten a time in which the host device has to be bound by the processing for the data transmission process between the client devices. The quasi host may monitor a condition of the data transmission between the client devices and inform the host device of presence/absence of any unusual condition or the like.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1:
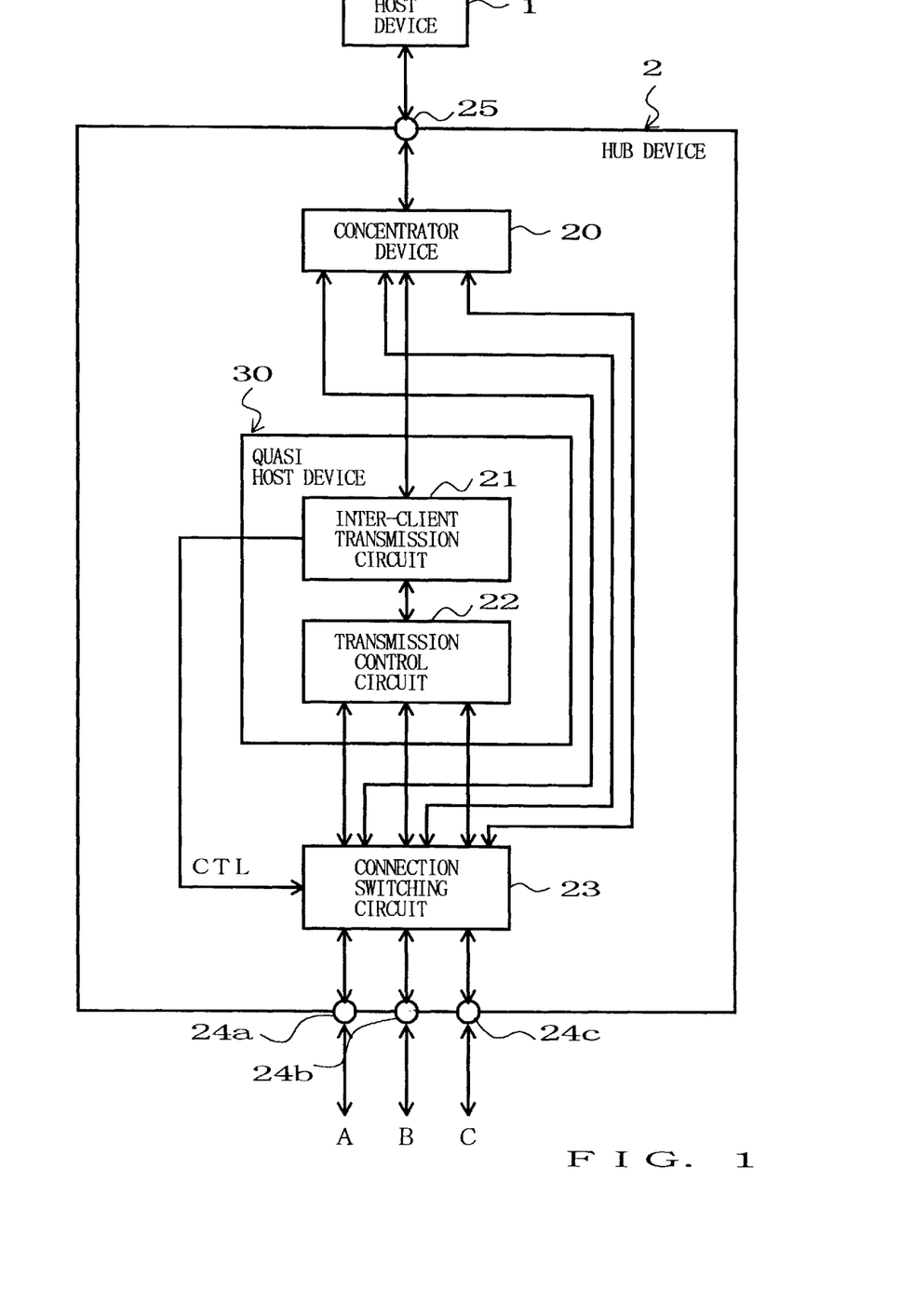
FIG. 1 is a block diagram illustrating a LAN (Local Area Network) system using, as a hub device, a data relaying unit constructed in accordance with a first embodiment of the present invention.

FIG. 1 is a block diagram illustrating a LAN (Local Area Network) system using, as a hub device, a data relaying unit in accordance with an embodiment of the present invention.

In FIG. 1, the hub device 2 according to the embodiment is provided with a plurality of input/output terminals and is connected with a host device 1 and client devices A, B and C. The input/output terminals 24a, 24b and 24c are intended for connection with the client devices A, B and C, respectively, and the input/output terminal 25 is intended for connection to the host device 1. The hub device 2 of the present invention includes a concentrator device 20 that, like the conventional ones, performs a function of concentrating respective data lines from the client devices A, B and C. The hub device 2 also includes an inter-client transmission circuit 21 which is constructed to allow communication with the the host device 1 via the concentrator device 20 and generate a selection control signal CTL to control a connection switching circuit 23 as will be later described. Normally, the host device 1 is a host computer.

The hub device 2 further includes a transmission control circuit 22 that carries out bus scheduling for the client devices A, B and C and monitors a communicating state between selected two of the client devices (A and B, A and C, or C and B). The monitored results are informed to the host device 1 by way of the inter-client transmission circuit 21; namely, this transmission control circuit 22 acts as a host for the client devices A, B and C. Accordingly, the inter-client transmission circuit 21 and transmission control circuit 22 together function as a quasi host device 30 as will be later described in detail. On the basis of the selection control signal CTL, the connection switching circuit 23 makes a selection as to whether the selected client devices should be connected to the concentrator device 20 or to the transmission control circuit 22.

Figure 2:
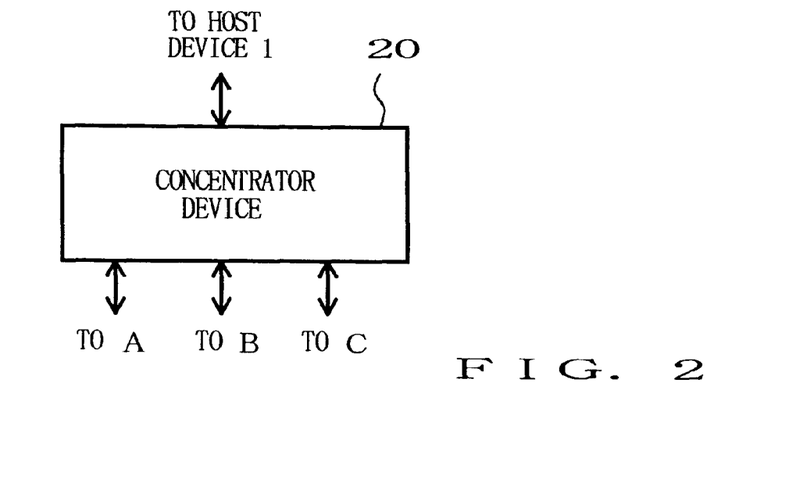
FIG. 2 is a block diagram showing an equivalent circuit of the hub device when no data transmission is carried out between client devices A and B in the embodiment of FIG. 1.
Figure 3:
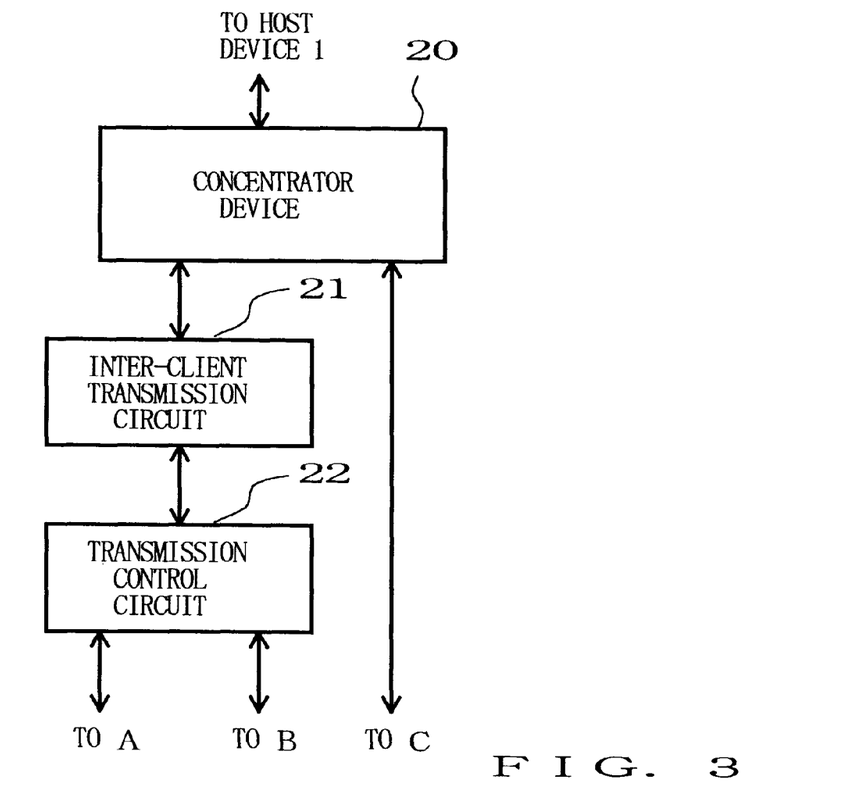
FIG. 3 is a block diagram showing an equivalent circuit of the hub device when data transmission is carried out between client devices A and B in the embodiment of FIG. 1.

The following paragraphs describe exemplary operation of the hub device 2 with reference to FIGS. 1 to 3, in relation to a case where a large quantity of data are to be transmitted between the client devices A and B, where such data transmission between the client devices A and B will be called "A–B transmission". First, in FIG. 1, the hub device 2 is reset to predetermined initial states by being activated by supply of electric power; in this case, the host device 1 issues a control signal to instruct the inter-client transmission circuit 21 to perform predetermined initializing operations. Upon receipt of the control signal from the host device 1, the inter-client transmission circuit 21 issues the selection control signal CTL to instruct connection between every client device A, B and C and the concentrator device 20. In this instance, the equivalent circuit of the hub device 2 is generally as shown in FIG. 2, where the concentrator device 20 is connected with each of the three client devices A, B and C. The equivalent circuit will be the same as shown in FIG. 2 even when the A–B transmission is not in operation.

Let's assume here that a need has arisen to transfer a large quantity of data from the client device A to the client device B. In this case, the host device 1 gives the inter-client transmission circuit 21 a signal informing that the A–B transmission is about to start. Upon receipt of the signal from the host device 1, the inter-client transmission circuit 21 issues the selection control signal CTL, instructing the A–B transmission, to the connection switching circuit 23. The connection switching circuit 23, in turn, makes selections such that the client devices A and B are connected to the transmission control circuit 22 and the other client C remains connected to the concentrator device 20. As a result, the equivalent circuit of the hub device 2 changes from that shown in FIG. 2 to another one shown in FIG. 3.

In this case, the data transmission between the client devices A and B is conducted via the transmission control circuit 22. Thus, the data from the client device A are not transferred to the client device B via the host device 1; as viewed from the host device 1, the data transmission from the client device A to the client device B has shifted to another segment (bus). Therefore, in this instance, it is only necessary for the host device 1 to control the inter-client transmission circuit 21.

Figure 4:
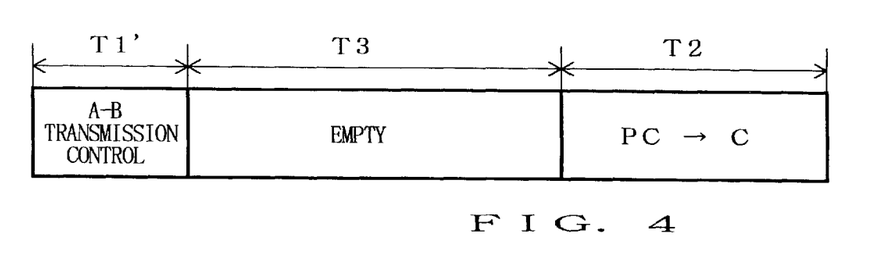
FIG. 4 is a diagram showing an example of bus scheduling performed by a host device in the embodiment of FIG. 1.

In FIG. 4, there is shown exemplary bus scheduling performed by the host device 1. At a time T1', control signals are exchanged between the host device 1 and the inter-client transmission circuit 21. These control signals include signals issued from the host device 1 to control a start and end of the A–B transmission and an error-informing signal issued from the inter-client transmission circuit 21, and the quantity of data involved in the exchange of these control signals is far smaller than that of the data transmitted between the client devices A and B. Thus, there is produced an empty time T3, and the data transmission can be carried out using this empty time T3.

In FIG. 3, due to the presence of the transmission control circuit 22, the client devices A and B view the hub device 2 as if the host device 1 moved into the hub device 2. Because the client devices A and B exchange data with the transmission control circuit 22 in this case, their operation is not different at all from that when they exchange data with the host device 1, and hence there is no specific need to modify the hardware and software configuration of the client devices A and B for this purpose. On the other hand, the host device 1 views the hub device 2 as if the client devices A and B disappeared and instead the inter-client transmission circuit 21 were currently connected to the hub device 2. Because the host device 1 can treat the inter-client transmission circuit 21 as a mere terminal as long as it is connected to the concentrator device 20, there is no specific need to modify the hardware and software configuration of the host device 1.

Thus, the above-described embodiment can reliably avoid a significant increase in loads on the host device 1 even when a large quantity of data are to be transmitted between the client devices A and B connected to the hub device 2. As a result, the current embodiment can greatly increase the total quantity of transmitted data in the entire LAN system. Further, because there is no specific need to modify the hardware and software configuration of the host device 1 and client devices A and B, any one of the conventionally-known hub devices for LAN systems can be used directly as the hub device 2 in the current embodiment, which permits a smooth shift to any desired new systems.

The quasi host device 30 may be costructed to implement the respective functions of the circuits 21 and 22 by hardware or by software using a microcomputer. The hardware of the quasi host device 30 includes a CPU, a program memory (ROM or RAM), and a data and working memory (RAM), as in known microcomputers. The program memory has prestored therein programs to perform the functions of the quasi host device 30 and corresponds to a recording medium readable by a machine which is means constituting the present invention.

Note that the number of the terminals 24a to 24c for connection with the client devices may be other than three, such as two, four or more. Further, one or more of the client devices to be connected with these terminals may be separate hub devices that are connected with each other in a cascaded or parallel fashion.

Next, a description will be made about a second embodiment of the present invention.

The second embodiment of the present invention is characterized in that a plurality of hub devices 2 identical in construction to that of the first embodiment are applied to USBs (Universal Serial Buses) which function as interfaces between a personal computer and various pieces of peripheral equipment. In the second embodiment, various pieces of peripheral equipment, such as a monitor, a keyboard, a printer and a modem are interconnected via star-connected buses and controlled by the host device on the personal computer.

Figure 5:
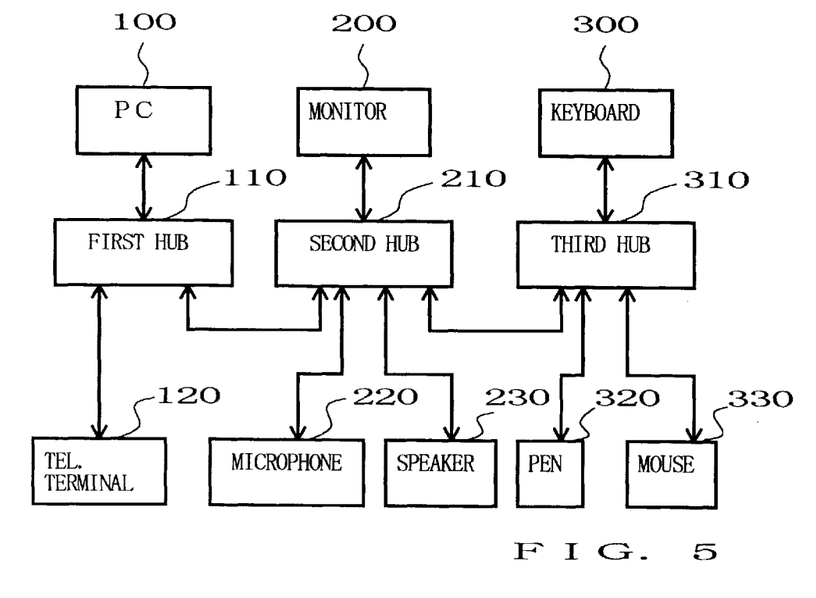
FIG. 5 is a block diagram of a personal computer system according to a second embodiment of the present invention.

An exemplary setup of the second embodiment will be described with reference to FIGS. 5 and 6. FIG. 5 is a block diagram of a personal computer (PC) system according to the second embodiment, in which reference numeral 110 represents the first hub device, 210 the second hub device and 310 the third hub device. Each of these hub devices 110, 210 and 310 may be constructed in the same manner as the above-described general-purpose hub device 2 of the first embodiment, as previously noted. Alternatively, the hub device of FIG. 1 may be used after having been partly modified; that is, the input/output terminal for connection with another hub device may be directly connected to the concentrator device 20 rather than being connected to the quasi host device 30.

Figure 6:
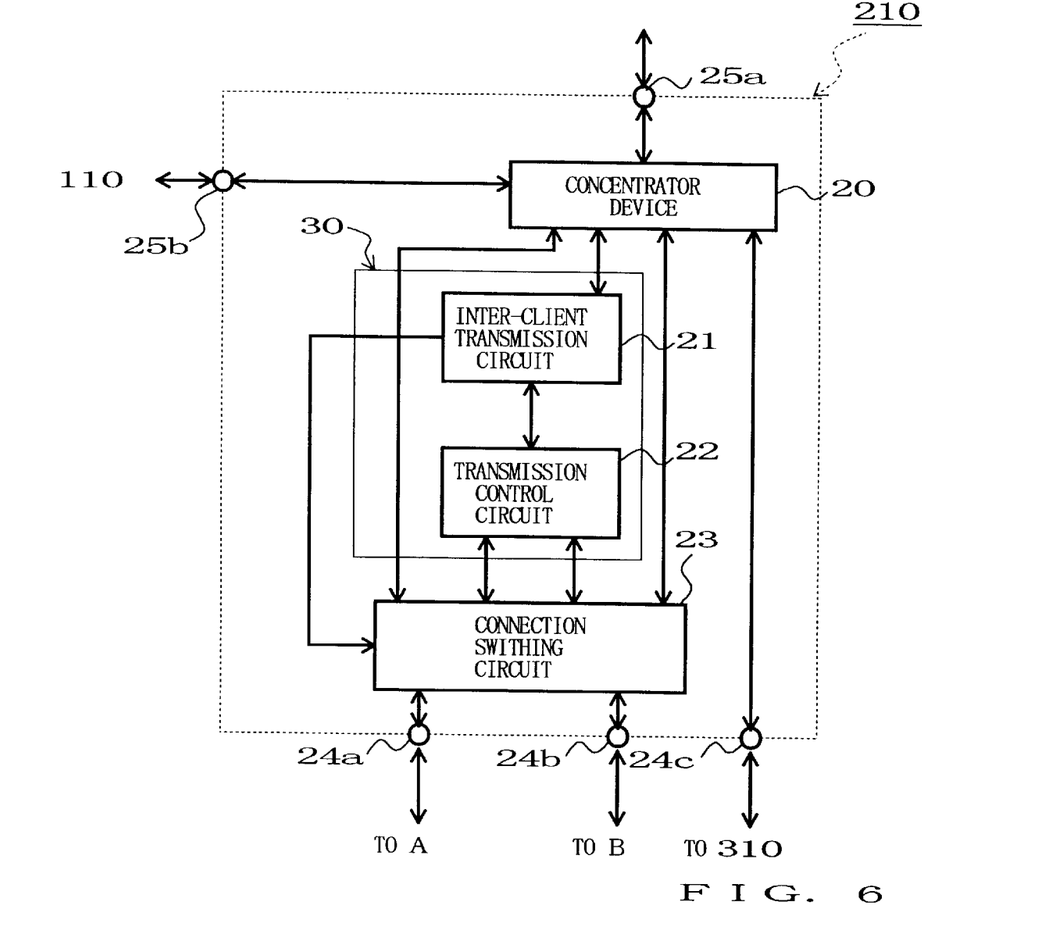
FIG. 6 is a block diagram showing an exemplary setup of a second hub device in the second embodiment.

FIG. 6 shows an exemplary setup of the second hub device 210 as an example of such a modified hub device. In the illustrated example of FIG. 6, direct data transmission via the quasi host device 30 can be conducted only between the client devices A and B, and the highest-order hub device 110 and lowest-order hub device 310 are connected to the concentrator 20 by means of the input/outputs 25b and 24c, respectively.

The first hub device 110 is provided within the personal computer (PC) 100 functioning as the host and is connected with a telephone terminal 120 and the second hub device 210. The second hub device 210 is provided within the monitor 200 that visually displays images and is connected with a microphone 220, a speaker 230 and the third hub device 310. The third hub device 310 is provided within the keyboard 300 for entering letters and marks and is connected with other input devices such as a pen 320 and a mouse 330. In this manner, the individual components are connected to the personal computer 100 via the first to third hub devices 110, 210 and 310 so as to function as client devices.

The personal computer 100 operates as follows. Because the personal computer 100 function as the host as previously noted, the bus scheduling is conducted by the personal computer 100. Thus, the data transmission is managed depending on the respective operating states of the individual client devices, and in this case, "plug and play", "hot insertion" and A–B transmission are controlled in accordance with the managed bus scheduling.

The "plug and play" refers to an operation where a bus cable is pulled out of connection (disconnected) with a given piece of equipment to remove the given piece from the system or a bus cable is newly inserted into (connected with) a hub device to add a given piece of peripheral equipment to the system while the power supply for the personal computer system is maintained in the turned-off state. Then, once the power supply is turned on, the personal computer 100 automatically identifies the connection or disconnection of the bus cable. As a consequence, the personal computer 100 carries out the bus scheduling taking into account the newly removed or added piece of peripheral equipment.

Further, the "hot insertion" refers to an operation where a bus cable of any of the hub devices is connected or disconnected while the power supply for the personal computer system is maintained in the turned-on state. In this case as well, the personal computer 100 automatically identifies the connection or disconnection of the bus cable and allows it to be reflected on the bus scheduling.

Also, in carrying out the A–B transmission as detailed in connection with the first embodiment, data are transmitted between the two pieces of equipment directly, without intervention of the personal computer 100. Thus, when the A–B transmission is conducted, the personal computer 100 allows it to be reflected on the bus scheduling.

The following paragraphs describe, as an example of the A–B transmission, a case where sound data picked up by the microphone 220 are output directly through the speaker 230.

Figure 7:
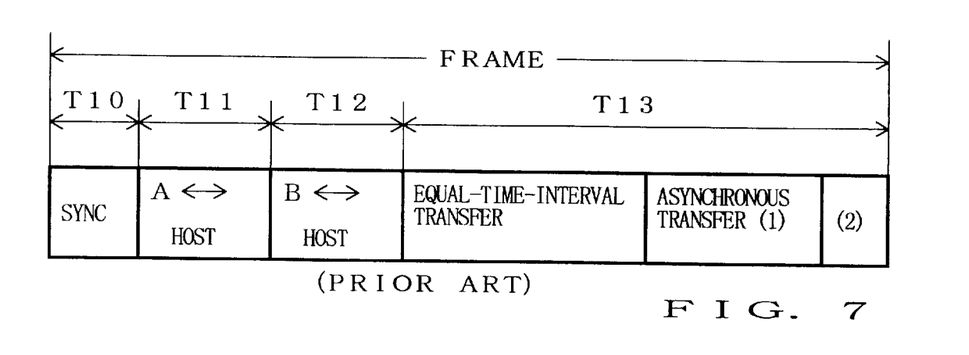
FIG. 7 is a diagram showing an example of bus scheduling performed by a conventionally-known hub device.

First, the bus scheduling performed by the personal computer 100 will be described. If the first to third hub devices 110, 210 and 310 are of conventional design, the bus scheduling will be conducted by the personal computer 100 generally as shown in FIG. 7. Namely, synchronizing data SYNC is placed at a time T10 located at the head of a frame, a next time T11 of the frame is assigned to data transmission between the client device A (microphone 220) and the host device (personal computer 100), and the following time T12 is assigned to data transmission between the client device B (speaker 230) and the host device (personal computer 100). Consequently, the sound data picked up by the microphone 220 are transferred to the speaker 230, by way of the second hub device 210, the first hub device 110 and then the personal computer 100 and again the first hub device 110 and the second hub device 210. At the remaining time T13, an equal-time-interval data transfer and asynchronous data transfers (1) and (2) are carried out.

Figure 8:
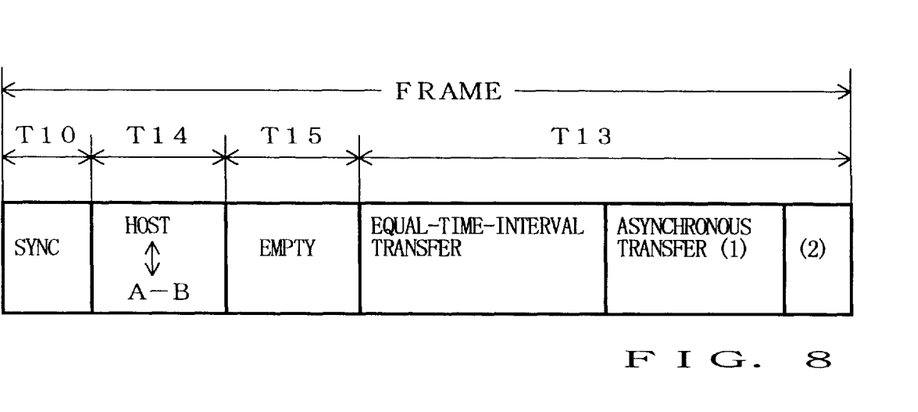
FIG. 8 is a diagram showing an example of bus scheduling performed by a personal computer when data transmission is carried out between client devices A and B in the second embodiment.

By contrast, if the A–B transmission is conducted using the first to third hub devices 110, 210 and 310 designed in accordance with the present invention, the sound data picked up by the microphone 220 are transferred via the transmission control circuit 22 to the speaker 230 without intervention of the personal computer 100 (see FIG. 6). Therefore, the personal computer 100 only needs to control the inter-client transmission circuit 21, and the bus scheduling is conducted by the personal computer 100 generally as shown in FIG. 8. In FIG. 8, at a time T14, control signals are exchanged between the personal computer 100 and the inter-client transmission circuit 21 so that the transmission circuit 21 is controlled. Because the quantity of data involved in the exchange of these control signals is far smaller than that of the sound data, an empty time T15 follows the time T14 and can be assigned to an equal-time-interval data transfer and asynchronous data transfers (1) and (2).

Figure 9:
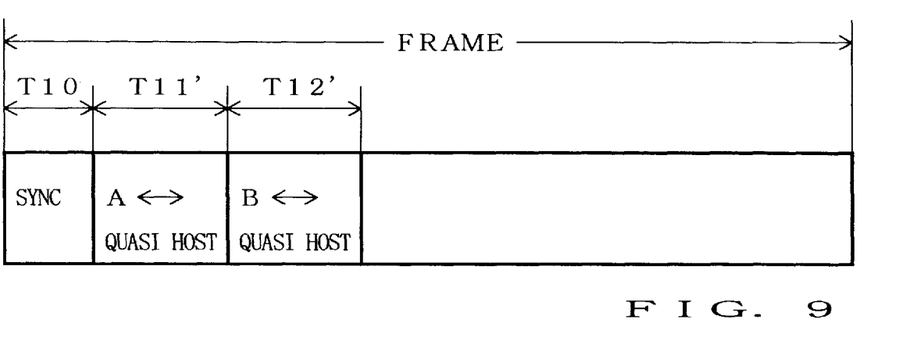
FIG. 9 is a diagram showing an example of bus scheduling performed by a transmission control circuit when data transmission is carried out between client devices A and B in the second embodiment.

In this case, the transmission control circuit 22 in the second hub device 210 behaves as if it were a host for the microphone 220 and speaker 230; in other words, the transmission control circuit 22 function as a "quasi" host device. The transmission control circuit 22 carries out the bus scheduling as shown in FIG. 9. At a time T11' in FIG. 9, the sound data picked up by the microphone 220 are transferred to the transmission control circuit 22, and then at a next time T12', the sound data are transferred from the transmission control circuit 22 to the speaker 230. This means that the data transmission between the personal computer 100 and the client device A (T11) and data transmission between the personal computer 100 and the client device B (T12) shown in FIG. 7 have moved to the transmission control circuit 22 in the second hub device 210.

Figure 10:
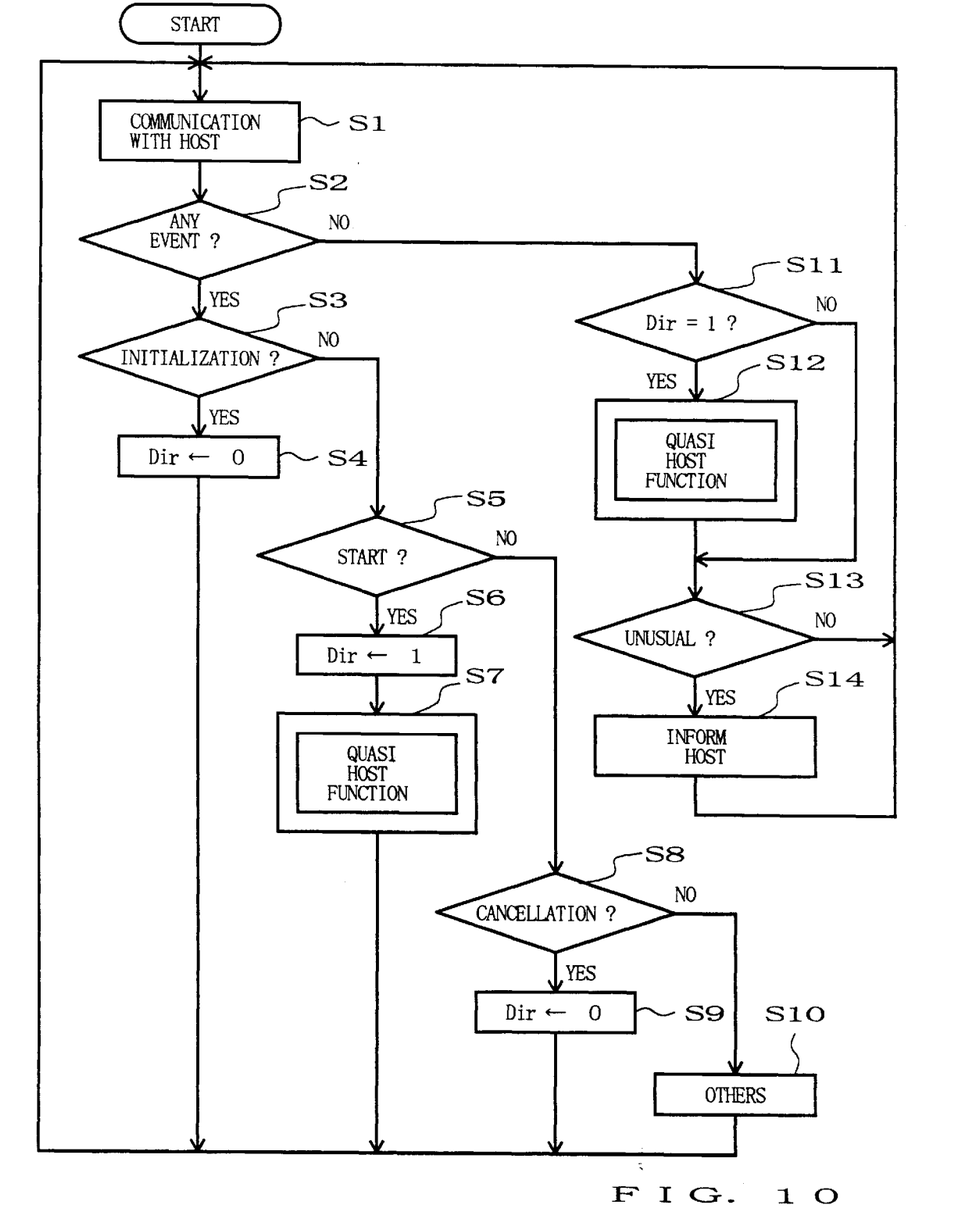
FIG. 10 is a flowchart illustrating exemplary operation of an inter-client transmission circuit in the embodiment.

The following paragraphs describe exemplary operation of the inter-client transmission circuit 21, with reference to FIG. 10. Upon start of communication with the host device (personal computer 100) at step S1, a determination is made at next step S2 as to whether any event is present in the communication. The event in this embodiment may be one instructing predetermined initializing operations, one instructing a start or end of direct data transfer, or one instructing any one of various other operations. If an event is received as determined at step S2 (YES), control proceeds to step S3, where a further determination is made as to whether the received event is the one instructing predetermined initializing operations. If answered in the affirmative at step S3, control proceeds to step S4 to set a flag Dir to a value "1" and then reverts to step S1.

Here, the above-mentioned flag Dir is one that indicates whether or not the sound data picked up by the microphone 220 should be transferred directly to the speaker 230 (i.e., direct data transfer between the client devices A and B). More specifically, the flag Dir at the value of "1" indicates that a direct data transfer should be executed using the transmission control circuit 22, while the flag Dir at the value of "0" indicates that no direct data transfer should be executed. Thus, the transmission control circuit 22 and the connection switching circuit 23 are controlled depending on the value of the flag Dir. When the flag Dir is set to "0" at step S4, the connection switching circuit 23 connects the microphone 220 and speaker 230 (i.e., client devices A and B) to the concentrator device 20, and the transmission control circuit 22 is deactivated.

If the event is not the one instructing initializing operations as determined at step S3 (NO), control branches to step S5, where a further determination is made as to whether or not the received event is the one instructing a start of direct data transfer. If the event instructs a start of direct data transfer as determined at step S5, then control moves on to step S6 in order to set the flag Dir to "1". Thus, in this case, the connection switching circuit 23 connects the microphone 220 and speaker 230 (i.e., client devices A and B) to the transmission control circuit 22. The transmission control circuit 22 carries out the bus scheduling as shown in FIG. 9 and functions as a quasi host device at step S7. After that, control reverts to step S1 to carry out communication with the host device (personal computer 100).

If the received event is the one instructing a start of direct data transfer as determined at step S5, control branches to step S8, where a further determination is made as to whether or not the received event is the one instructing a cancellation of direct data transfer. If determined in the affirmative at step S8, the flag Dir is set to "0", and then control reverts to step S1. If, on the other hand, the received event is not the one instructing a cancellation of direct data transfer as determined at step S8, it means that the current received event does not concern the direct transfer at all, so that control further branches to step S10 to perform an operation as dictated by the event and then reverts to step S1.

Further, if no event is present in the communication with the host device as determined at step S2, control branches to step S11 in order to further determine whether the flag Dir is currently at "1". If answered in the affirmative at step S11, control proceeds to next step S12, where the transmission control circuit 22 functions as a quasi host device. Then, at step S13, a determination is made as to whether there has occurred any error or other unusual condition in the communication performed by the transmission control circuit 22. If answered in the affirmative at step S13, control proceeds to next step S14 to inform the host device (personal computer 100) of the unusual condition. If no unusual condition has occurred in the communication as determined at step S13, control loops back to step S1. If the flag Dir is at "0", a negative determination results at step S11, so that control goes to step S13 to carry out the above-described operations.

Because the second embodiment includes the hub devices, each having a direct transfer function, in the USB-based personal computer system, data can be transferred directly between the different pieces of peripheral equipment connected to the personal computer 100, without intervention of the personal computer 100. This arrangement allows the personal computer 100 to carry out the bus scheduling with a sufficient time margin and hence permits transmission of sufficient quantities of data between the personal computer 100 and various pieces of peripheral equipment.

The present invention should not be construed as being limited to the above-described embodiments and various modifications are possible as follows without departing from the basic features of the invention.

It should be obvious that the transmission control circuit 22 can perform bus scheduling not only between the client devices A and B but also between optionally selected ones of the client devices A, B and C. For example, the transmission control circuit 22 may perform the bus scheduling such that data from the client device A are output to the client device B and/or client device C. In this case, the direct data transfer is carried out between any two of the client devices selected by the transmission control circuit 22. Whereas the connection switching circuit 23 is controlled by the selection control signal CTL in the described embodiments, it may be controlled directly by an external host device. Further, as previously noted, whereas the transmission control circuit 22 has been described as having three inputs, it may have more than three or two inputs.

Furthermore, whereas the transmission control circuit 22 has been described above as monitoring direct data transmission between specific client devices (e.g., the A–B transmission) and informing the host device of the monitored results via the inter-client transmission circuit 21, the information to the host device may be conducted as necessary, at any other time than when a transmission error has occurred, to indicate a type or quantity of transmitted data, as long as it relates to a condition of the data transmission.

Moreover, although the preferred embodiments have been described above in relation to serial buses, parallel buses may be used. Also, the above-described hub device 2 may be applied to a LAN system based on optical cables or wireless communication scheme. In addition, the first embodiment may be applied to a LAN system comprising cascaded hub devices 1, as in the second embodiment.

The present invention, as has been described so far, permits a direct data transfer by means of a quasi host device and hence allows the host device connected with the data relaying unit to perform bus scheduling with a sufficient time margin. Further, there is no need to modify various pieces of equipment connected to the data relaying unit, and hence good compatibility is assured.

What is claimed is:

1. A data relaying unit for connection between a host computer and a plurality of client devices, said data relaying unit comprising a quasi host device having a plurality of connection terminals corresponding to said client devices, wherein in accordance with instructions from said host computer, said quasi host device manages a schedule of a data transmission path between selected ones of said client devices connected with said connection terminals and also controls connection switching so as to selectively connect individual ones of said connection terminals to either said quasi host device or said host computer, wherein the connection terminals corresponding to the selected ones of said client devices are connected to said quasi host device.

2. A data relaying unit as recited in claim 1 wherein in addition to managing said schedule of a data transmission path between selected ones of said client devices connected with said connection terminals, said quasi host device detects a condition of data transmission between said selected client devices so as to output a transmission condition detection signal to said host computer, and said quasi host device controls the data transmission path in accordance with an instruction from said host computer.

3. A data relaying unit for connection between a host device and a plurality of client devices, said data relaying unit comprising:
   a plurality of connectors corresponding to said client devices;
   a control device which, when said host device instructs that data transmission should be performed between specific ones of said client devices, manages a schedule for the data transmission between said specific client devices; and
   a connection switching device which connects said connectors corresponding to said specific client devices to said control device and connects other said connector corresponding to other said client device to said host device,
   whereby data is transmitted between said specific client devices in accordance with the schedule managed by said control device, without intervention of said host device.

4. A data relaying unit for connection between a host device and a plurality of client devices, said data relaying unit comprising:
   a plurality of connectors corresponding to said client devices;
   a control device which, when said host device instructs that data transmission should be performed between specific ones of said client devices, manages a schedule for the data transmission between said specific client devices; and
   a connection switching device which connects said connectors corresponding to said specific client devices to said control device and connects other said connector corresponding to other said client device to said host device; and
   a device which monitors a condition of the data transmission between said specific client devices and informs said host device of the monitored condition of the data transmission.

5. A data relaying unit for connection between a host device and a plurality of client devices, said data relaying unit comprising:
   a plurality of connectors corresponding to said client devices;
   a control device which, when said host device instructs that data transmission should be performed between specific ones of said client devices, manages a schedule for the data transmission between said specific client devices;
   a connection switching device which connects said connectors corresponding to said specific client devices to said control device and connects other said connector corresponding to other said client device to said host device; and
   a device which informs said host device of the schedule managed by said control device.

6. A data relaying system for connection between a host device and a plurality of client devices, said data relaying system comprising a plurality of data relaying units corresponding to a plurality of client groups each including a plurality of client devices, said host device being connected with a first one of said data relaying units, other said data relaying unit being cascaded to said first data relaying unit to be able to receive an instruction from said host device, each of said data relaying units comprising:
   a plurality of connectors for connection between said client devices in the corresponding group;
   a control device which, when said host device instructs that data transmission should be performed between specific ones of said client devices in the corresponding group, manages a schedule for the data transmission between said specific client devices; and
   a connection switching device which connects said connectors corresponding to said specific client devices to said control device and connects other said connector corresponding to other said client device to said host device,
   whereby data is transmitted between said specific client devices in accordance with the schedule managed by said control device, without intervention of said host device.

7. A method for transmitting data between a host device and a plurality of client devices under management by said host device, said method comprising the steps of:
   providing a quasi host device which manages data transmission between said client devices;
   when data transmission is to be performed between said host device and a specific one of said client devices, causing said host device to manage a schedule for the data transmission;
   when said host device instructs that data transmission is to be performed between specific ones of said client devices, activating said quasi host device to manage a schedule for the data transmission between said specific client devices; and
   switching connection of data transmission paths depending on whether the data transmission is to be performed between said host device and said specific client device or between said specific client devices.

8. A method for transmitting data between a host device and a plurality of client devices under management by said host device, said method comprising the steps of:

when data transmission is to be performed between said host device and a specific one of said client devices, performing connection switching such that a data transmission path is formed between said host device and said specific client device;

when data transmission is to be performed between specific ones of said client devices, performing connection switching such that a data transmission path is formed between said specific client devices without intervention of said host device; and when data transmission is to be performed between specific ones of said client devices, monitoring a condition of the data transmission and informing said host device of the monitored condition of the data transmission.

9. A machine-readable recording medium containing a group of instructions of a program to be executed by a computer, said program comprising the steps of:

instructing a first mode to perform data transmission between a host device and a specific client device;

instructing a second mode to perform data transmission between a plurality of specific client devices and when said second mode is instructed, activating a quasi-host device and causing said quasi-host device to manage a schedule for the data transmission between said specific client devices;

performing, when first said mode is instructed, connection switching such that a data transmission path is formed between said host device and said specific client device; and performing, when said second mode is instructed, connection switching such that a data transmission path is formed between said specific client devices without intervention of said host device.

10. A machine-readable recording medium as recited in claim 9 wherein said program further comprises the step of monitoring, when said second mode is instructed, a condition of the data transmission and informing said host device of the monitored condition of the data transmission.

11. A data relaying unit for connection between a host computer and a plurality of client devices and including a plurality of connection terminals, said data relaying unit comprising:

a quasi host device which, in accordance with an instruction from said host computer, manages a schedule of a data transmission path between specific ones of said client devices connected with said connection terminals, wherein said connection terminals corresponding to the specific ones of said client devices are connected to said quasi host device; and a device which performs connection switching so as to selectively connect individual ones of said connection terminals to either said quasi host device or said host computer.

12. A data relaying unit as recited in claim 11 wherein in addition to managing said schedule of a data transmission path between specific ones of said client devices connected with said connection terminals, said quasi host device detects a condition of data transmission between said specific client devices so as to output a transmission condition detection signal to said host computer, and said quasi host device also controls the data transmission path in accordance with an instruction from said host computer.

13. A data relaying unit for connection between a host device and a plurality of client devices, said data relaying unit comprising:

a first input/output terminal corresponding to said host device;

a plurality of second input/output terminals corresponding to said client devices;

a quasi host device which, in accordance with an instruction from said host device, controls direct data transmission between said client devices; and a connection switching device which selectively connects individual ones of said second input/output terminals to either said first input/output terminal or said quasi host device, wherein in accordance with an instruction from said host device, said connection switching device connects said second input/output terminals of predetermined ones of said client devices to said quasi host device so as to permit direct data transmission between said predetermined client devices.

* * * * *